Aug. 24, 1926.　　　　　　　　　　　　　　　1,597,569
G. W. BARRINGER
TRAPDOOR FOR AUTOMOBILE FLOORS
Filed March 13, 1926

WITNESSES　　　　　　　　　　　　　　　INVENTOR
George W. Barringer
BY
ATTORNEYS

Patented Aug. 24, 1926.

1,597,569

UNITED STATES PATENT OFFICE.

GEORGE W. BARRINGER, OF LAWRENCE, NEW YORK.

TRAPDOOR FOR AUTOMOBILE FLOORS.

Application filed March 13, 1926. Serial No. 94,459.

This invention relates to trap doors for automobile floors and has for an object to provide an improved construction wherein the door may be readily opened by the foot whenever desired.

Another object of the invention is to provide a trap door for automobile floors wherein the door may be readily opened and automatically closed or may be adjusted so as to remain open.

In the accompanying drawing—

Figure 2 is an enlarged top plan view of the trap and part of the automobile floor illustrated in Figure 1.

Figure 3 is a sectional view through Figure 2 on line 3—3.

Figure 4 is a sectional view through Figure 2 on line 4—4.

Figure 1:
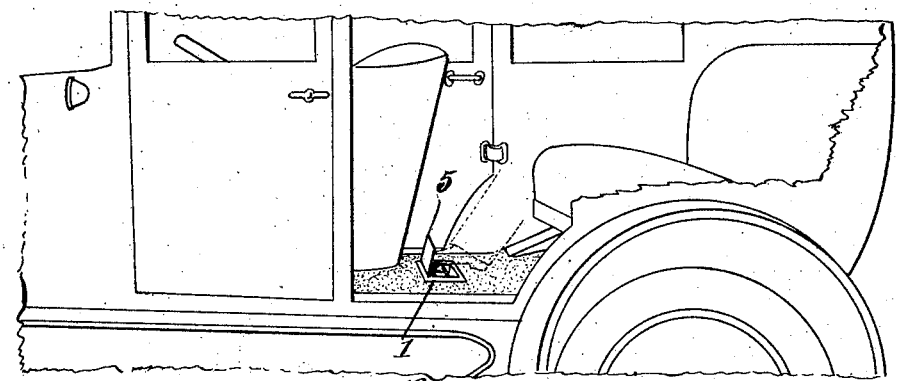
Figure 1 is a fragmentary view in outline of an automobile, disclosing an embodiment of the invention applied to the floor thereof.
Figure 1:
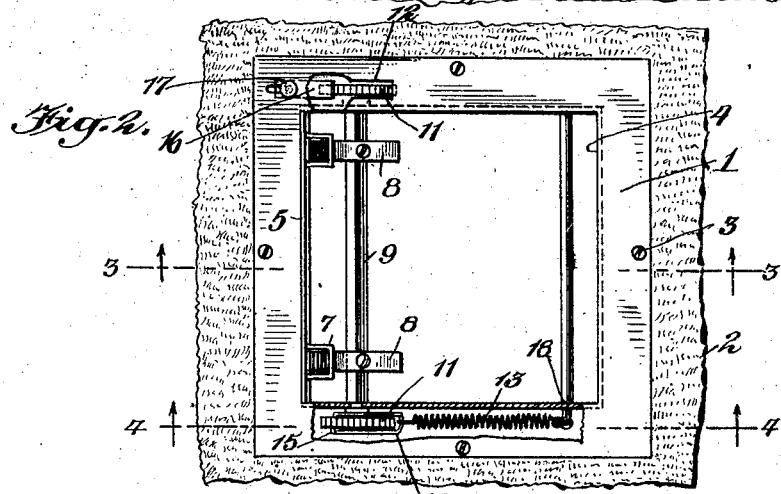
Figure 1:
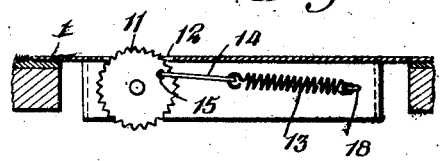
Figure 1:
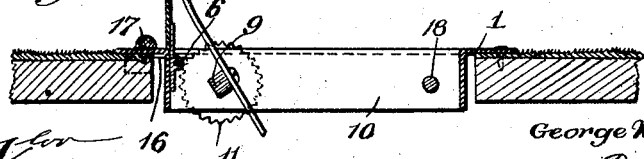

In automobiles and particularly sedans or other closed cars, it is desirable to have a small opening which may be closed at any time in order that the same may be used as means of throwing small articles out of the automobile without opening a window or door. In some instances, it might be used in the capacity of a spittoon or ash tray for smokers. It is, therefore, evident that the trap door embodying the invention may be applied to any part of the floor or, if desired, to some other part of the automobile, without departing from the spirit of the invention.

As shown particularly in Figures 2 to 4 inclusive, the trap is provided with a frame 1 applied to the floor 2 of the automobile and secured in place in any desired manner, as for instance, by the screws 3. The frame 1 is provided with an opening 4 normally closed by the lid or cover 5. The parts are preferably made from metal though they could be made from wood or other material. The cover 5 is hingedly connected at 6 to the frame 4 and is adapted to be swung to a horizontal position and a vertical position as desired. A pair of guiding tubular members 7 are secured to the lower surface of cover 5 and into these project the cover lifting and closing arms 8 which are preferably somewhat resilient though stiff enough to perform the desired function. These arms are secured by screws or otherwise to a shaft 9 carried by the depending wall 10 of frame 1. The shaft 8 is rotatably mounted in the wall 10 and is preferably provided adjacent each end, with a ratchet wheel 11, said ratchet wheels projecting a short distance through suitable apertures 12 in the frame 1. A spring 13 is connected to the bar 18 at one end and to a substantially U-shaped straddling member 14 at the opposite end, said U-shaped straddling member having the ends 15 loosely fitted into an aperture in one of the wheels 11. If desired, the spring 13 and associated parts could be provided in respect to each of the wheels 11, though usually one is sufficient. The spring 13 continually tends to move shaft 9 in such a direction that the arms 8 will resiliently hold the cover 5 closed as shown in Figure 4. When it is desired to raise the cover, either of the ratchet wheels 11 may be pressed by the foot and rotated to the desired extent for fully opening the cover 5 as shown in Figure 3 or for partly opening the same. As soon as the wheels 11 have been released, spring 13 will immediately return the parts to the position shown in Figure 4.

In case it should be desired to leave the cover 5 raised for an appreciable time, the same is raised as just described and then the sliding catch 16 is moved over until the same engages between certain teeth of one of the wheels 11. This prevents a reverse rotation of the wheels 11 and, consequently, holds the parts in their open position. When the parts are in this condition and it is desired to close cover 5, the button or projection 17 is pushed to the left as shown in Figure 3 or away from the wheels 11 and immediately spring 13 will function to close the cover. It will be noted that the arms 8 loosely fit in the guide so that they may properly function.

What I claim is:

1. A trap door for automobile floors comprising a frame having an opening provided with a depending wall extending through the floor of the automobile whereby access may be had to the interior of the automobile through said opening, a cover hingedly connected with said frame near one edge of the opening, said cover normally closing said opening, a rock shaft rotatably mounted in said depending wall, an arm rigidly secured to said rock shaft and operatively connected with said cover for swinging the cover to an opened and closed position, a manually actuated member connected with said shaft for rocking the shaft, and a spring connected with said shaft for rocking said shaft in such a direction as to close said cover.

2. A trap door for automobile floors comprising a frame having a comparatively large opening, a cover normally closing said opening, rotatable means for opening and closing said cover, said rotatable means having ratchet wheels positioned to be operated by the foot of the person sitting in the automobile, and a spring connected with said rotatable means for moving the same so as to move the cover to a closed position.

3. A trap door for automobile floors comprising a frame having a central opening, a cover hingedly connected to the frame and normally closing the opening, a rotatable structure having manually actuated ratchet wheels for opening and closing the cover, a spring for revolving said ratchet wheels so as to close said cover, and a manually actuated member positioned to be moved into engagement with one of said ratchet wheels for holding the same against rotation whereby said cover may be locked in an open position.

4. A trap door for automobile floors comprising a frame, a cover hingedly connected with the frame and normally closing the opening in the frame, a plurality of tubular members connected to the under surface of said cover, an arm for each of said tubular members, said arms extending loosely into the tubular members, a rock shaft rotatably mounted on said frame, means for rigidly securing said arms to said rock shaft, a wheel secured to said shaft, said wheel partly extending through and above said frame whereby the foot of a person may press against the wheel and rotate the same for opening said cover, and a spring operatively connected with said shaft for rotating the same in such a direction as to close said cover.

GEORGE W. BARRINGER.